United States Patent Office 3,473,409
Patented Oct. 21, 1969

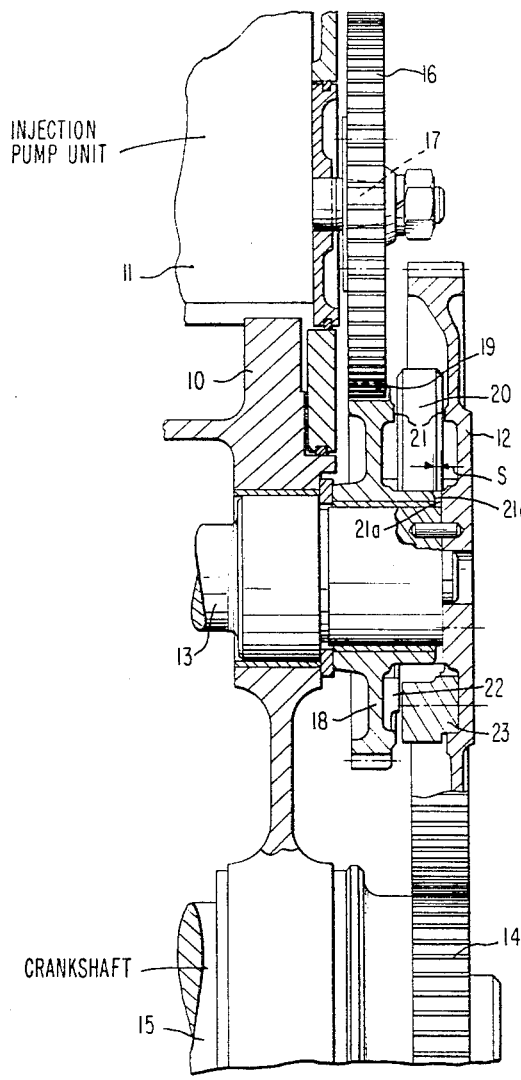
FIG. I

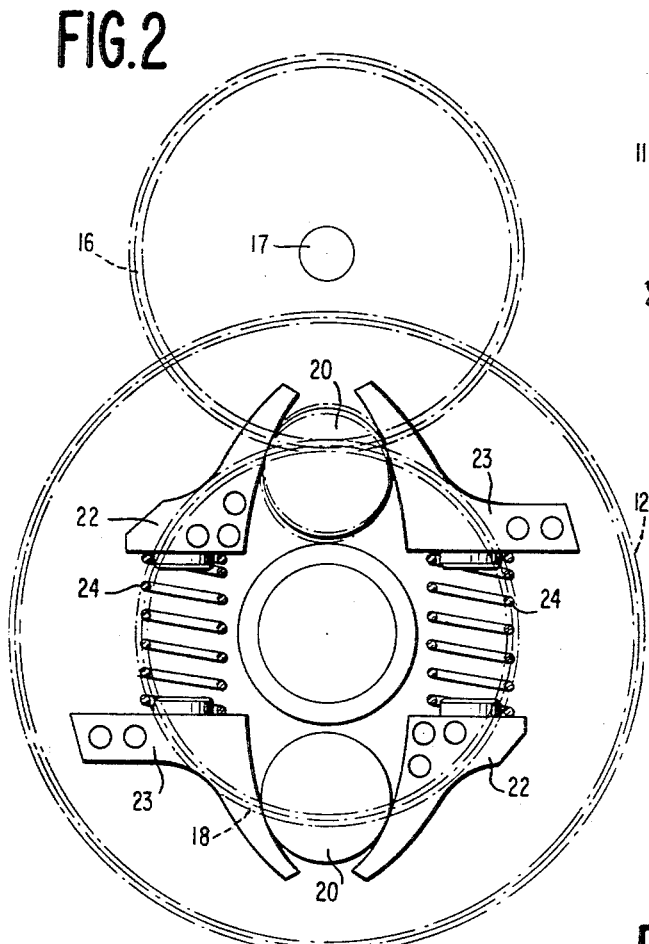
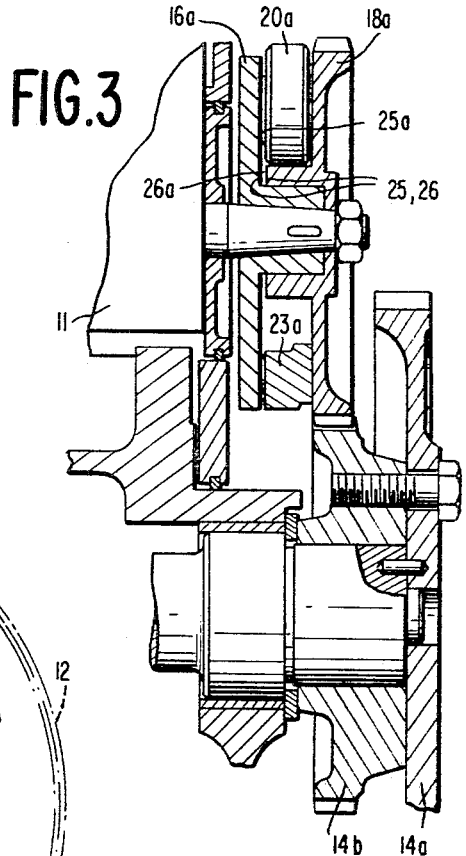
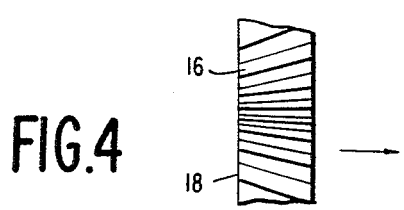
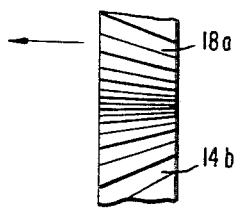

3,473,409
INJECTION TIMER WITH DAMPING MEANS BETWEEN CRANKSHAFT AND INJECTION PUMP
Josef Reisacher, Fellbach, and Dietrich Gwinner, Waiblingen, Germany, assignors to Daimler-Benz Aktiengesellschaft, Stuttgart-Unterturkheim, Germany
Filed Mar. 6, 1967, Ser. No. 620,891
Int. Cl. F02m 39/02
U.S. Cl. 74—574    8 Claims

ABSTRACT OF THE DISCLOSURE

An installation for the control of the beginning of injection of an injection-pump unit for internal combustion engines which comprises an input gear (12) on the side of the engine, an output gear (16) on the side of the pump, an intermediate gear (18) which is in meshing engagement, preferably by way of inclined teeth with one of the two gears consisting of the input and output gear, in the illustrated embodiment with the output gear (16); the intermediate gear (18) is operatively connected with the other of the two gears, in the illustrated embodiment, with the input gear (12) by way of flyweights (20) and additionally is rotatably as well as axially movably supported with respect to the other gear (16) in such a manner that the intermediate gear is displaced by an axial component of its meshing engagement in the direction of the other gear. Friction linings may be provided at the engaging surfaces of the intermediate gear, the flyweights and the other gear or at the corresponding engaging surfaces between the intermediate gear and the other gear.

Background of the invention

The present invention relates to an installation for the control of the beginning of the injection of an injection-pump unit for an internal combustion engine having an input gear wheel on the side of the engine and an output gear wheel on the pump side, in which an intermediate gear wheel arranged in the power-transmitting train between the input and the output gear, on the one hand, is in meshing engagement either with the input or the output gear as well as, on the other, is coaxially and rotatably supported with respect to the other gear wheel and is in non-rotatable engagement therewith by way of flyweights.

With installations of this type, it is known in the prior art to dampen the oscillations produced by the injection unit between the gears which are in engagement with each other by way of the flyweights so as to permit a change in the rotational speeds, in that the flyweights are of two-partite construction and compression springs are arranged between the subdivided weights. The compression springs effect a continuous frictional engagement between the flyweights and the associated gears. These prior art installations have the disadvantage that the flyweights may remain stuck in case of decreasing pump rotational speed owing to the spring forces. The two-partite construction of the flyweights as well as the arrangement of additional compression springs increases the costs of these installations.

Summary of the invention

The purpose underlying the present invention consists, on the one hand, in eliminating the aforementioned disadvantages, and on the other, to achieve a damping between the gears in operative engagement by way of the flyweight which is effective in dependence on driving or input torque of the injection unit.

The outlined purpose is solved according to the present invention in that the intermediate gear is displaceable by an axial component of its meshing tooth engagement in the direction of the coaxial input or output gear wheel.

The general concept, which underlies the present invention, is to arrange the intermediate gear so as to be spirally movable in the direction of the flyweights and to derive the spiral force from the driving torque of the injection unit. An increasing axial force is thus also effective on the intermediate gear with an increasing pump moment so that the intermediate gear is pressed axially against the flyweights and the latter against the coaxial input or output gear. The occurring frictional engagement between these two parts then effects the damping responsive or dependent on the load.

The engaging surfaces for the flyweights may be provided with friction linings for purposes of increasing the damping action according to a further feature of the present invention.

In one embodiment of the present invention corresponding surfaces at the intermediate gear wheel and the coaxial input or output gear wheel may be in frictional engagement with each other. The flyweights are thereby uninfluenced by the axial spiral forces, and the two gear wheels are in direct mutual frictional engagement. For purposes of increasing the friction effect, also in this case the corresponding friction surfaces may be provided with friction linings.

The meshing tooth engagement of the intermediate gear with the associated input or output gear may be established, for example, by inclined teeth from which then results in a simple, advantageous manner the requisite axial spiral or helical force at the intermediate gear.

The flyweights can now be constructed in one piece and additional compression springs are eliminated altogether.

Accordingly, it is an object of the present invention to provide an installation for controlling the beginning of the injection of injection pump units for internal combustion engines which is simple in construction, reliable in operation and eliminates the aforementioned shortcomings and drawbacks encountered with the prior art constructions.

Another object of the present invention resides in a control mechanism for controlling the injection beginning of an injection-pump unit for internal combustion engines which utilizes relatively few and simple parts while effectively damping oscillations or vibrations which occur as a result of variations in the pump load.

A further object of the present invention resides in a control device of the type described above which is relatively inexpensive by the elimination of additional parts, required heretofore in the prior art.

A still further object of the present invention resides in a control device for controlling the beginning of the injection of injection pump units for internal combustion engines in which a damping between the gear wheels connected with each other by way of the flyweights is effected which is dependent on the driving torque of the injection unit.

These and further objects, features and advantages of the present invention will become more obvious from the following description when taken in connection with the accompanying drawing which shows, for purposes of illustration only, one embodiment in accordance with the present invention, and wherein:

FIGURE 1 is a partial cross-sectional view through one embodiment of an installation for the control of the injection beginning of an injection-pump unit for internal combustion engines in accordance with the present invention;

FIGURE 2 is a partial side view of the structure in FIGURE 1;

FIGURE 3 is a view similar to FIGURE 1, but showing a modification of the present invention;

FIGURE 4 is a partial view of the meshing teeth of the FIGURE 1 device; and

FIGURE 5 is a partial view of the meshing teeth of the FIGURE 3 device.

Referring now to the FIGURES 1, 2 and 4 of the drawing, an injection unit of any conventional construction and indicated by reference numeral 11 is secured at the crankcase 10 of an internal combustion engine of any suitable construction. The installation for the control of the injection beginning consists of an input gear 12 which is constituted by the driving gear of the cam shaft 13. This driving gear 12 is in meshing engagement with the pinion 14 of the crankshaft 15 of the internal combustion engine. The output gear of the installation for the control of the injection beginning is constituted by the spur gear 16 which is non-rotatably connected with the drive shaft 17 of the injection unit 11. An intermediate gear 18 is coaxially and rotatably supported on the cam shaft 13 so as to be rotatable and axially movable relative to the input gear 12. The intermediate gear 18 is in meshing engagement with the output gear 16 by way of inclined teeth 19 and with the input gear 12 by way of flyweights 20 of any conventional construction. It is thus seen, that a gear train is provided between the injection pump unit 11 and the crankshaft 15, which includes a first gear 16 meshing with a second gear 18, which second gear 18 is mounted for axial movement toward and away from the gear train member 12. An axial play S is provided between the input gear 12 and the intermediate gear 18 so that the intermediate gear 18 under the influence of the axial forces occurring at the inclined teeth 19 can be displaced against the input gear 12. As a result of this displacement, the flyweights 20 are brought into engagement with the friction surfaces 21 at the input gear 12 and the intermediate gear 18. However, it is also possible that the gears 12 and 18 are brought into frictional engagement with each other directly by the friction surfaces 21a without any contact of the flyweights 20 with the surfaces 21. The surfaces 21 or 21a may be provided in any conventional manner (not illustrated) with friction linings or friction linings may be arranged between the surfaces 21a.

Although the flyweight connection between gears 12 and 18 is known, it is shown in detail in the drawing, particularly FIGURE 2. The levers 22 and 23 are connected to the gears 18 and 12, with springs 24 therebetween. With movement of the flyweights 20 radially outward upon increased rotational speed, the arms 22, 23 will pivot to relatively rotate the gears 12 and 18 to thus adjust the phase angle for the injection pumps.

As shown in FIGURE 4, the inclined tooth structure of the gears 16 and 18 will produce a component of axial force acting on the gear 18 in the direction of the arrow, which will move the gear 18 to the right from its position shown in FIGURE 1 to engage the friction surfaces 21a and/or 21. The force, indicated by the arrow in FIGURE 4, that is perpendicular to the frictional surfaces will vary correspondingly with the torque transmitted between the gears 16, 18. Thus, the frictional force at surfaces 21, 21a will accordingly vary with the torque transmitted between gears 16, 18, because it is dependent upon the force normal to the friction surfaces.

The modification shown in FIGURE 3 employs numerals corresponding to those employed in the previously described embodiment for corresponding parts. The same flyweight structure 20a is employed between the gear parts 16a and 18a, as has been described previously. Frictional linings 25a and 26a are shown for their respective friction surfaces 25, 26. The component of axial force engaging the friction surfaces is shown by the arrow in FIGURE 5 resulting from the torque transferred between the inclined gear teeth of gears 14b and 18a.

Thus, it is obvious that the present invention is not limited to the details shown and described herein but is susceptible to numerous changes and modifications as known to a person skilled in the art, and we therefore do not wish to be limited to the details shown and described herein.

We claim:

1. An installation for the control of the injection beginning of an injection pump unit for internal combustion engines, comprising input gear means on the side of the engine, output gear means on the side of the pump, and means operatively connecting said input gear means with said output gear means including intermediate gear means and flyweight means, said intermediate gear means being in meshing engagement with one of the two gear means consisting of said input and output gear means and being supported coaxially and rotatably with respect to the other gear means, said intermediate gear means being operatively connected with said other gear means by way of said flyweight means, and said intermediate gear means being displaceable in the direction of said other gear means by an axial component of its meshing engagement with said one gear means.

2. An installation according to claim 1, wherein the engaging surfaces at the intermediate gear means for the flyweight means are provided with friction lining means.

3. An installation according to claim 2, wherein the engaging surfaces at said other gear means for the flyweight means are provided with friction lining means.

4. An installation according to claim 1, wherein the engaging surfaces at said other gear means for the flyweight means are provided with friction lining means.

5. An installation according to claim 1, wherein the corresponding surfaces at the intermediate gear means and said other gear means are in frictional engagement.

6. An installation according to claim 5, wherein said corresponding surfaces are provided with friction lining means.

7. An installation for the control of the injection beginning of an injection pump unit for internal combustion engines, comprising: a gear train drivingly connecting said internal combustion engine and said injection pump unit; said gear train including a first gear, a second gear meshing with said first gear, a train member rotatably mounted with respect to said second gear, and flyweight means drivingly interposed between said train member and said second gear; means automatically providing increased resistance to relative rotation between said train member and said second gear in response to torque transmitted by said gear train for damping vibration therebetween.

8. The installation according to claim 7, wherein said last-mentioned means includes said second gear being mounted for relative axial movement, and said first and second gears being provided with a skewed gear tooth construction for producing an axial force in proportion to the torque transmitted thereby.

References Cited

UNITED STATES PATENTS

| | | | |
|---|---|---|---|
| 1,261,763 | 4/1918 | Cameron | 74—574 |
| 1,282,571 | 10/1918 | Guay | 74—574 XR |
| 2,333,122 | 11/1943 | Prescott | 74—574 |
| 2,703,563 | 3/1955 | Hancock. | |

CARLTON R. CROYLE, Primary Examiner

A. D. HERRMANN, Assistant Examiner

U.S. Cl. X.R.

123—139